(12) United States Patent
Meléndez-González et al.

(10) Patent No.: US 6,536,677 B2
(45) Date of Patent: Mar. 25, 2003

(54) AUTOMATION AND CONTROL OF SOLAR AIR CONDITIONING SYSTEMS

(75) Inventors: Luis V. Meléndez-González, Melbourne, FL (US); Jorge E. González-Cruz, Cabo Rojo, PR (US); Gerson Beauchamp-Báez, Mayagüez, PR (US)

(73) Assignee: University of Puerto Rico, San Juan, PR (US)

( * ) Notice: Subject to any disclaimer, the term of this patent is extended or adjusted under 35 U.S.C. 154(b) by 0 days.

(21) Appl. No.: 09/877,814

(22) Filed: Jun. 8, 2001

(65) Prior Publication Data

US 2002/0053214 A1 May 9, 2002

Related U.S. Application Data

(60) Provisional application No. 60/210,534, filed on Jun. 8, 2000.

(51) Int. Cl.[7] .............................................. G05D 23/00
(52) U.S. Cl. .................... 237/2 B; 126/587; 126/714; 62/324.4
(58) Field of Search ................ 237/2 B, 2 A; 165/128, 62; 62/324.4; 126/628, 587, 714

(56) References Cited

U.S. PATENT DOCUMENTS

| | | | |
|---|---|---|---|
| 3,491,545 A | | 1/1970 | Leonard |
| 3,552,142 A | | 1/1971 | Schlichtig |
| 3,605,436 A | | 9/1971 | Gammill |
| 4,027,821 A | * | 6/1977 | Hayes et al. .................. 122/37 |
| 4,143,705 A | * | 3/1979 | Awalt, Jr. .................... 126/400 |
| RE30,027 E | | 6/1979 | Hockman |
| 4,164,125 A | * | 8/1979 | Griffiths ..................... 62/238.3 |
| 4,205,529 A | | 6/1980 | Ko |
| 4,222,244 A | * | 9/1980 | Meckler ..................... 62/235.1 |
| 4,251,997 A | | 2/1981 | Newton |
| 4,257,395 A | * | 3/1981 | Wieder ....................... 126/587 |
| 4,269,263 A | * | 5/1981 | Yukimachi et al. ......... 165/240 |
| 4,273,184 A | | 6/1981 | Tanaka |
| 4,300,535 A | | 11/1981 | Munroe |
| 4,420,947 A | * | 12/1983 | Yoshino ...................... 126/585 |
| 4,474,169 A | * | 10/1984 | Steutermann ............... 126/592 |
| 4,507,936 A | | 4/1985 | Yoshino |
| 4,513,584 A | * | 4/1985 | Woyke ....................... 62/235.1 |
| 4,577,679 A | * | 3/1986 | Hibshman ................... 165/236 |
| 4,611,654 A | * | 9/1986 | Buchsel ...................... 126/636 |
| 4,798,056 A | | 1/1989 | Franklin |
| 4,827,735 A | * | 5/1989 | Foley .......................... 62/260 |
| 5,943,868 A | | 8/1999 | Dietz |

FOREIGN PATENT DOCUMENTS

| | | |
|---|---|---|
| DE | 19535841 A1 | 3/1997 |
| GB | 2063444 | 6/1981 |

OTHER PUBLICATIONS

S.A. Klein, J. A. Duffie, W. A. Beckman—*Transient Considerations of Flat–Plate Solar Collectors*—Journal of Engineering for Power—Apr. 1974– pp. 109–113—Solar Energy Laboratory, The Universiy of Wisconsin, Madison, Wisconsin, USA.

* cited by examiner

*Primary Examiner*—Derek Boles
(74) *Attorney, Agent, or Firm*—Patent Law Offices of Heath W. Hoglund

(57) ABSTRACT

A solar powered air conditioning system includes an absorption machine coupled to three primary loops. A heat loop provides energy to the absorption machine. A cooling tower loop exhausts heat from the absorption machine. A chilled water loop is used to draw heat from a room or building. The heat loop provides energy from a boiler and/or from a number of solar collectors. In one mode of operation, the solar collectors circulate through a storage tank. The flow through the solar collectors is regulated to maximize energy collection.

15 Claims, 10 Drawing Sheets

AUTOMATION AND CONTROL OF SOLAR AIR CONDITIONING SYSTEMS

Applicants claim the benefits of priority from U.S. Provisional Application No. 60/210,534, filed Jun. 8, 2000, which is incorporated herein by reference.

GOVERNMENT GRANTS

This research was sponsored by the federal government under National Renewable Energies Laboratories grant no. DEAC36-83CH10093.

FIELD OF THE INVENTION

The invention relates generally to solar powered air conditioning systems and more particularly to control systems used to improve the operational efficiency of solar powered air conditioning systems.

BACKGROUND OF THE INVENTION

The possibility of using solar energy to decrease the usage of electricity in air conditioning systems has been widely suggested. Of all the proposed technologies, solar-assisted air conditioning systems using absorption chillers have become one of the most appealing. Solar absorption cooling systems have been installed in different parts of the world to evaluate their feasibility and performance. These types of systems are described in:

Van Hattem, D., and Dato, P. A., *Description and Performance of an Active Solar Cooling System, Using a LiBr-H2O Absorption Machine,* Energy and Buildings, 1981, Vol. 3, pp. 169–196;

Yellot, J. I., *Operation of an Active Solar Air-Conditioning System in a Hot, Dry Climate,* ASHRAE, 1982, Vol 2;

Bong, T. Y., Ng, K. C., and Tay, A. O., *Performance Study of a Solar-Powered Air Conditioning System,* Solar Energy, 1987, Vol.39, No. 3, pp. 173–182; and Meza, J. I., Khan, A. Y., and González, J. E., *Experimental Assessment of a Solar Assisted Air Conditioning System for Applications in Puerto Rico,* Solar Engineering, 1998, pp. 149–154.

Each of the these references is incorporated herein by reference in their entirety.

Although these systems have demonstrated the feasibility of reducing electricity usage, they have not become commercially available or widely used. A number of factors have contributed to this delay. In order to provide a cost-effective product, the electricity savings must be sufficient to justify the cost of the overall system. In these systems, the solar collectors represent a significant portion of system cost. Thus, it becomes critical to maximize the use of energy gathered by the solar collectors to minimize the number of solar collectors required by the system.

In addition, the solar collectors are only able to gather energy during daylight hours. The actual energy collections peak at approximately midday, then fall off into the afternoon. To extend the operational hours of these systems, energy storage tanks are used. As with the collectors, it becomes critical to maximize the amount of energy accumulated in the storage tank. This operates to extend the working hours of the system.

SUMMARY OF THE INVENTION

According to one aspect of the invention, the operational hours of a solar powered air conditioning system are extended by a control system. The control system determines a desired flow rate through a set of solar collectors that operates to maximize the energy collection. The control system also determines when the energy collected by the solar collectors will contribute to the energy in a storage tank. When this determination is favorable, the controller directs flow from the solar collectors into the storage tank.

According to another aspect of the invention, a solar powered air conditioning system circulates a fluid through solar collectors. An associated controller regulates the rate at which the fluid circulates. The rate is increased when the solar collectors produce a greater increase in temperature of the fluid. The rate is decreased when the solar collectors produces a lesser increase in temperature of the fluid. The heated fluid is pumped through an absorption chiller. A refrigerant is also pumped through the absorption chiller and through a heat exchanger positioned within a building. The heat exchanger cools the ambient temperature of the building.

According to a further aspects of the invention, the fluid from the solar collectors is circulated though a storage tank, and then pumped to the absorption chillier The temperature of the storage tank is determined at a plurality of positions. The fluid circulated from the storage tank to the solar collectors is drawn from the storage tank proximate the position having a lower temperature than the other positions. When the temperature of the fluid from the solar collectors is not greater than the temperature in the storage tank, then the fluid is circulated through a closed loop that excludes the storage tank. Otherwise, the fluid is circulated through the storage tank to effect an increase in temperature. This control is performed by operation of a three-way valve.

According to still further aspects of the invention, a coolant is circulated between the absorption chiller and a cooling tower by operation of a pump. A refrigerant is pumped through the absorption chiller and through the heat exchanger without applying a load at the heat exchanger at start up. In this mode, the heat exchanger has negligible effect upon the ambient temperature of the building. After applying a load, the refrigerant is pumped through the heat exchanger for an extended period of time after circulation of the fluid through the solar collectors terminates.

According to another aspect of the invention, a solar powered air conditioner pumps a first fluid through solar collectors. The flow rate is directly related to the amount of energy absorbed by the solar collectors. The temperature of the first fluid is determined after passing through the solar collectors. The temperature of the first fluid in a stratified storage tank is also determined. The first fluid from the solar collectors is pumped to the stratified storage tank when the temperature of the first fluid after passing through the solar collectors is greater than the temperature of the first fluid in the stratified storage tank. In one mode of operation, the first fluid from the solar collectors is pumped to an absorption machine while the plurality of solar collectors absorb energy. In another mode of operation, the first fluid from the stratified storage tank is pumped to the absorption machine when the plurality of solar collectors absorb an decreased amount of energy. A second fluid is pumped through the absorption chiller and to a heat exchanger configured to reduce an internal temperature of a building.

According to another aspect of the invention, a solar powered air conditioning system includes solar collectors, a pump, thermocouples, an absorption machine, a shut-off valve, a controller and a cooling circuit. The solar collectors are positioned to absorb energy. The pump is coupled with the solar collectors and configured to circulate a fluid through the solar collectors. One thermocouple is positioned at the plurality of solar collectors to determine a temperature of the fluid after passing through the plurality of solar collectors. A proportional flow valve is coupled with the plurality of solar collectors and configured to control a rate of flow of the fluid through the plurality of solar collectors. The solar collectors are coupled with a storage tank. Another thermocouple is positioned at the storage tank and configured to determine a temperature of the fluid within the storage tank. The controller operates the shut off valve to direct flow of the fluid as between a circulating loop from the solar collectors to the storage tank and a closed loop that excludes the storage tank. This determination is made based upon the respective temperatures of the fluid through the storage collectors and the storage tank. A cooling circuit couples with the absorption machine and is configured to effect a decrease in temperature to the interior of a building.

According to further aspects of the invention, the shut-off valve is a three-way valve. The absorption machine is also coupled with a cooling tower. The controller is further configured to direct the proportional flow valve to effect a fixed temperature difference across the plurality of solar collectors.

These and other aspects of the invention will be better appreciated with reference to the drawings and detailed description that follows.

DETAILED DESCRIPTION

Figure 1:
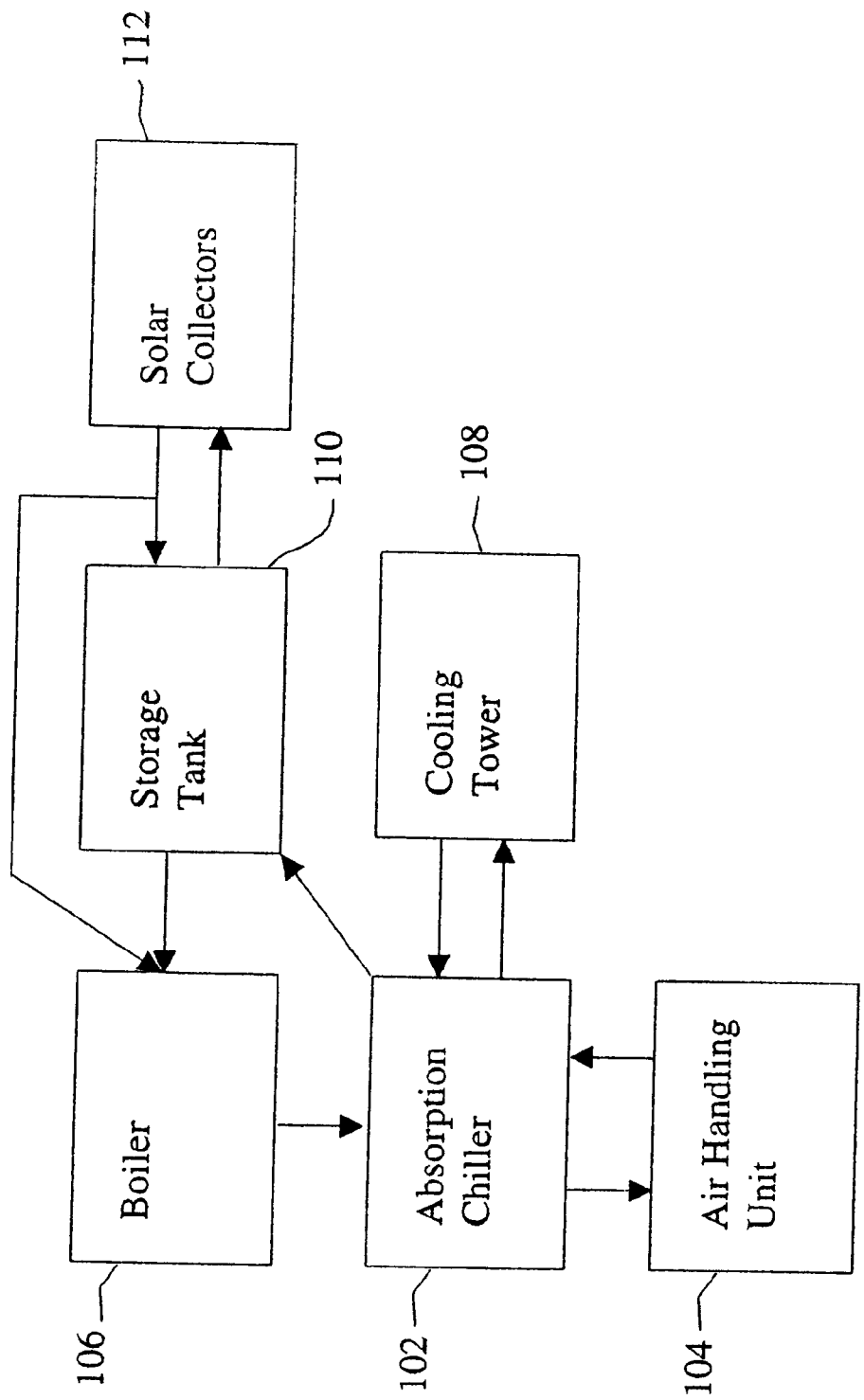
FIG. 1 is a system block diagram of one preferred solar powered air conditioning system, including an absorption chiller 102, an air handling unit 104, a boiler 106, a cooling tower 108, a storage tank 110 and solar collector array 112.

In one preferred embodiment of the invention, a solar powered air conditioning system consists of a number of interconnected components and subsystems. These are described with reference to FIG. 1. As shown, these components include an absorption chiller 102, an air handling unit 104, a boiler 106, a cooling tower 108, a storage tank 110 and solar collectors 112. These components form subsystems that include a solar collector loop, a heat loop, a cooling tower loop and a chilled water loop.

The solar collector loop generally includes the solar collectors 112 and the storage tank 110. In operation, a fluid is passed through the solar collectors 112. These consist of a set of individual solar collectors arranged in a series configuration. The energy collected by the solar collectors 112 is passed to the storage tank 110. The storage tank includes flexible stratification manifolds. This permits fluid to be drawn from an area or level of the storage tank 108 where the water is at the lowest temperature. This in turn helps to maximize the efficiency of the solar collectors 112. In operation, the fluid from the solar collectors 112 may be diverted through the boiler 106 and provided to the absorption chiller 102.

The heat loop operates to provide energy to the absorption chiller 102. This energy is used to extract heat from a building through the chilled water loop. The heat loop begins by drawing a heated fluid from the storage tank 110. The fluid is then circulated through boiler 106. Depending upon the temperature of the fluid and the demands upon the absorption chiller 102, the boiler 106 is used to increase the energy provided to the absorption chiller 102. The fluid experiences a decrease in temperature as it circulates through the absorption chiller 102, and is then returned to the storage tank 110.

The cooling tower loop includes the absorption chiller 102 and the cooling tower 108. The cooling tower loop operates to condense a refrigerant prior to an evaporation that produces a cooling effect. This cooling effect is, in turn, used to cool a building.

Finally, the chilled water loop includes the absorption chiller 102 and the air handling unit 104. This loop operates to absorb heat energy from a building. The exchange is made by circulating a fluid cooled through the absorption chiller through the air handling unit 104.

Figure 2:
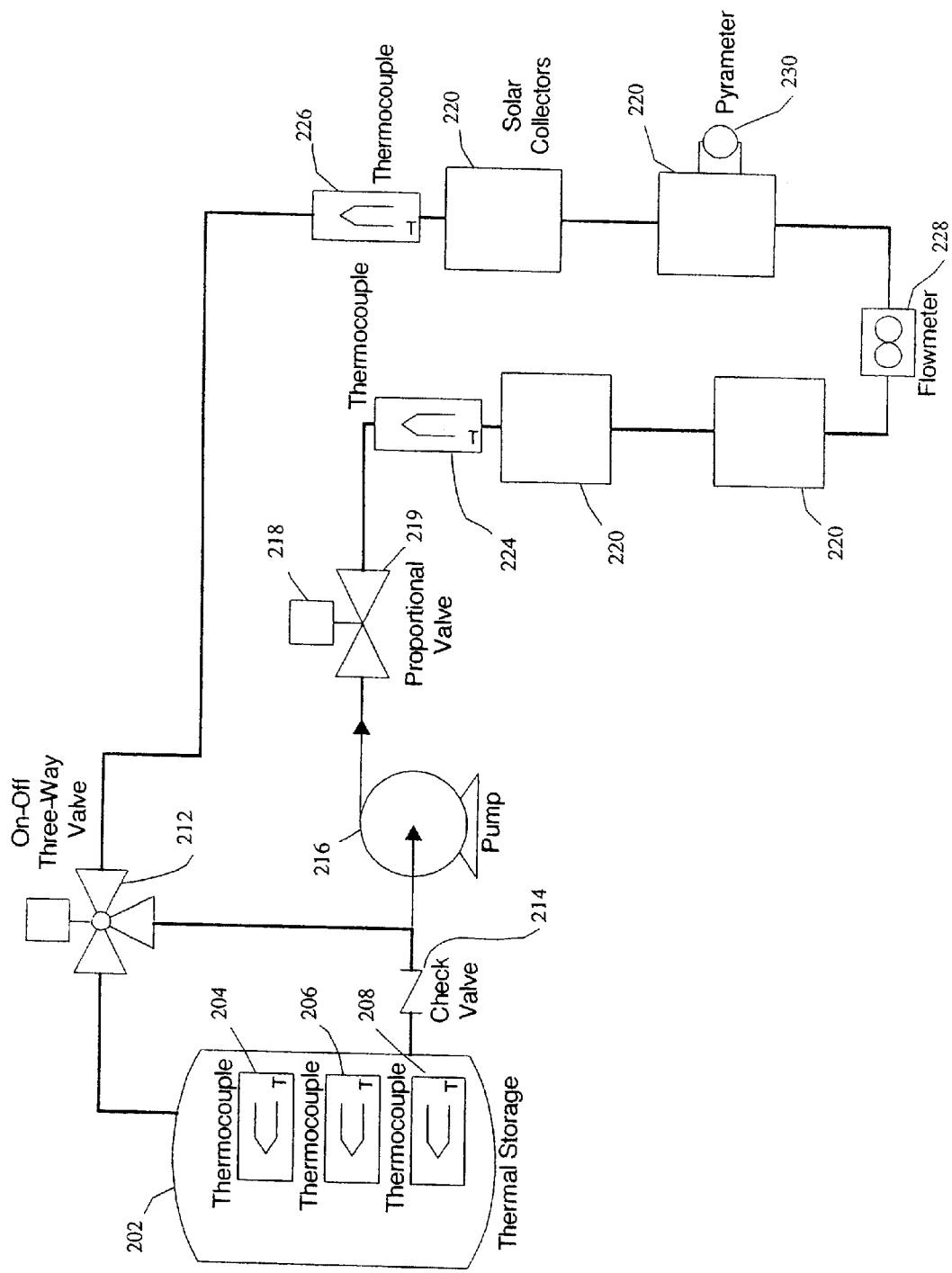
FIG. 2 is a block diagram showing one preferred circuit between storage tank 202 and solar collectors 220.

Further details of the solar collector loop, the heat loop, the cooling tower loop and the chilled water loop along with related control elements are now described with reference to FIGS. 2 and 3. In particular, FIG. 2 is a block diagram of one preferred solar collector loop along with related sensors and controls.

The solar collectors 220 are the main power supply for the air conditioning system. The solar collectors 220 should be selected so that approximately 70 to 80% of the energy used by the air conditioning system will come from the solar collector energy. The remaining 20 to 30% will come from electricity and a gas-fired boiler. The thermal storage tank 202 is required to provide the necessary backup energy in the case of unfavorable weather conditions and to extend the hours of operation of the air conditioning system. The storage tank 202 is equipped with flexible stratification manifolds that are capable of distributing the incoming water in the corresponding stratification layer according to its temperature. Likewise, the flexible stratification manifolds allow the outgoing water to be drawn from the stratification layer according to its temperature. Stratification in the storage tank 202 improves the performance of both the absorption chiller and the solar collectors 220 since the absorption chiller improves its performance with higher input temperature while the collector's efficiency is higher at lower input temperatures. The water is drawn and returned to the stratification layer that maximizes the performance of the solar collectors 220 and the absorption chiller.

The solar collector loop includes eight sensors and three actuators that are used to control the system. The three actuators of the solar collector loop include a fixed fluid pump 216, a proportional valve 219, and an on-off three-way valve 212. The fixed fluid pump 216 provides the fluid loop from the storage tank 202 into the array of solar collectors 220. The proportional valve 219 regulates the flow rate of the fluid. The on-off three-way valve 212 determines whether the solar collectors 220 are recirculating the fluid in a sub-loop or in a closed loop with the storage tank 202. The sub-loop excludes circulation through storage tank 202. In one mode of operation, water is circulated though this sub-loop until it contains sufficient energy to contribute to the storage tank.

The solar collector loop also includes a check valve 214. In operation, this ensures that fluid does not flow into the draw of the storage tank 202 when operating in the sub-loop mode.

The sensors include five thermocouples 204, 206, 208, 224 and 226. Thermocouples 204, 206 and 208 are used to monitor the temperature stratification of storage tank 202. Thermocouples 224 and 226 are used to monitor the input and output temperatures of the solar collector array, respectively. The other three sensors are a pyrometer 230 to monitor the incoming solar radiation, a flow meter 228 to monitor the mass flow rate through the solar collectors 220, and a potentiometer 218 that provides the feedback signal from the proportional flow valve 219.

Figure 3:
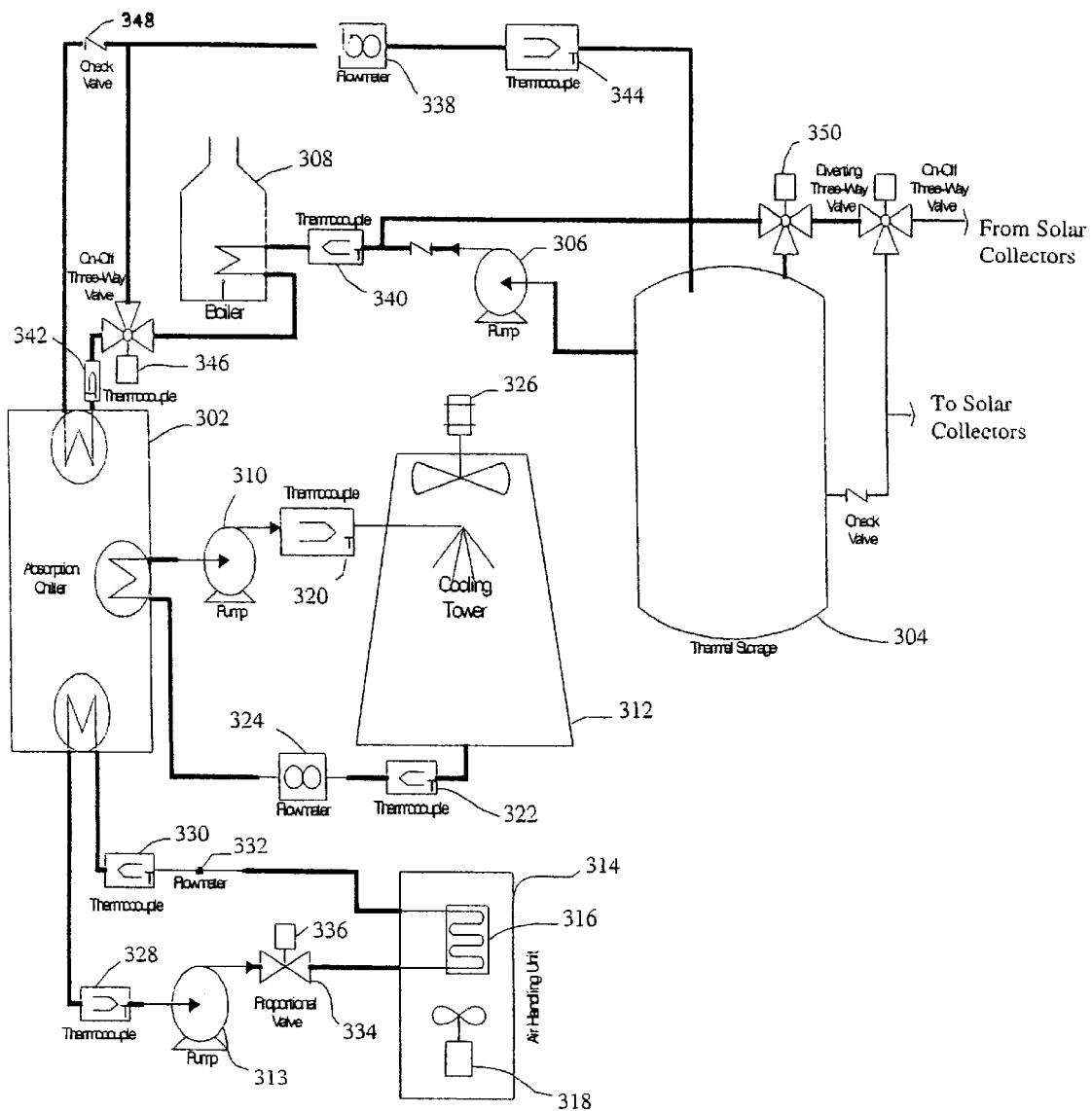
FIG. 3 is a block diagram showing one preferred circuit between absorption chiller 302 and storage tank 304, and one preferred circuit between absorption chiller 302 and cooling tower 312, and one preferred circuit between absorption chiller 302 and air handling unit 314.

Although the return through the on-off three-way valve 212 is shown directly connected with storage tank 202, in one preferred embodiment a diverting three-way valve connects between the on-off three-way valve 212 and storage tank 202 to provide an optional diversion circuit to the absorption chillier One such configuration is shown in FIG. 3, as diverting three-way valve 350.

Turning to FIG. 3, the heat loop, the cooling tower loop and the chilled water loop are further described. Each of these flow loops circulate through an absorption chiller 302. Preferably, the absorption chiller uses lithium-bromide as a refrigerant.

The absorption chiller 302 uses the heat loop and the cooling tower loop as inputs and the chilled water loop as its output. The heat loop is responsible for providing the heat energy used to power the absorption cycle and separate the refrigerant from the salt solution. The cooling tower loop is used for two purposes. First, it will condense the refrigerant prior to the evaporator, in which the cooling effect is produced. Second, it will allow for the resulting solution out of the evaporator to recombine with the salt solution. Finally, the chilled water loop delivers the cooled water to the air handling unit that operates to cool a room or building.

As functional elements, the heat loop draws water or other suitable fluid from a storage tank 304 by a pump 306. The water circulates through a boiler 308 that operates to increase its energy content when necessary under current operational conditions. After passing though the boiler 308, the water is passed to the absorption chiller 302 as the energy source for its cooling cycle. The water is then returned to storage tank 304.

The cooling tower loop includes a pump 310 that draws from the absorption chiller 302 and circulates though a cooling tower 312. The return from the cooling tower 312 is directed to the absorption chiller 302 to complete the loop.

The chilled water loop also includes a pump 313 that draws from the absorption chiller 302 and circulates through an air handling unit 314. The air handling unit 314 is responsible for drawing heat energy and humidity out of the air within a building. This exchange is performed by passing the cooled liquid through a radiator 316. A fan 318 blows ambient room air through the radiator to effect the heat transfer. The cooled liquid is, as a result, warmed and returned to the absorption chiller 302 for another cycle.

Together, these three loops include a total of eleven sensors and eight actuators. The cooling tower loop has two thermocouples 320 and 322 that monitor the temperature signals for the inlet and outlet pipes, respectively. It also includes a flow meter 324 to measure the cooling tower loop's mass flow rate. The cooling tower loop also has two actuators, the water pump 310 and the cooling tower fan 326. The cooling tower loop does not require a flow control valve, thus the flow is set at its nominal operating state and then monitored for safety purposes.

The chilled water loop also has two thermocouples 328 and 330 to monitor the inlet and outlet temperatures, respectively. It also includes a proportional flow control valve 334. The flow control valve 334, the water pump 313 and the fan 318 are the actuators for this loop. The chilled water loop further includes a flow meter 332 to measure the mass flow rate. As well as a potentiometer 336 to provide a feedback signal from the proportional flow control valve 334.

Finally, the heat loop has a flow meter 338 and three temperature sensors 340, 342 and 344. The additional temperature sensors in this loop are required due to the gas-fired boiler 308. The first temperature sensor 340 monitors the inlet to the boiler. The second temperature sensor 342 measures the boiler's outlet as well as the inlet to the absorption chiller 302 from the heat loop. The third temperature sensor 344 measures the heat loop outlet temperature. The actuators in the heat loop are the water pump 306, the boiler 308 and an on-off three-way valve 346.

The inlet water to the heat loop can be delivered from two different sources. The first source, which will be used during the majority of its operation, comes from the thermal storage tank 304. When the tank is the source for the loop, the pump 306 that is located in this loop drives the water from the storage tank 304 to the absorption chiller 302 and back to the storage tank 304. The other source is the solar collector array using the pump in the solar collector loop. In this configuration, a three-way diverting valve bypasses the water coming from the collector into the tank directly to the absorption chiller 302. The outlet from the absorption chiller then goes back to the storage tank 304.

The heat loop also includes a three-way valve 346 that is used to bypass the absorption chiller 302. At start up, this bypass loop may be used to raise the temperature of the water before circulating it through the absorption chiller 302. A check valve 348 prevents back flow from the bypass loop into the return from the absorption chiller 346.

Figure 4:
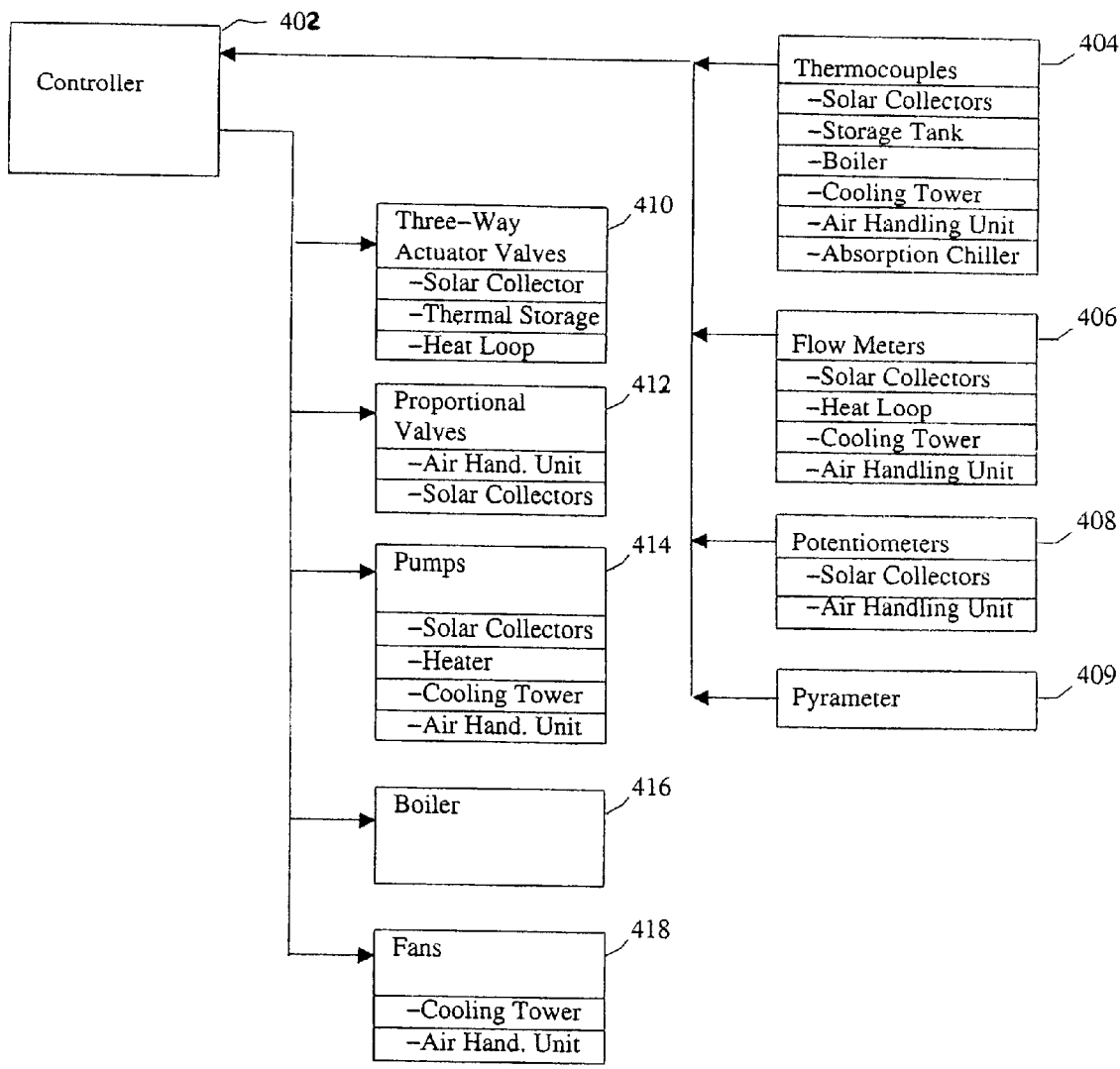
FIG. 4 is a block diagram of one preferred control system configured for use with the solar powered air conditioning system of FIG. 1.

Turning to FIG. 4, one preferred control system configured for use with the above-described solar collector loop, heat loop, cooling tower loop and chilled water loop is described. The controller 402 is implemented on a personal computer having a number of input and output cards connected thereto. Of course, a variety of other controllers would also be suitable provided they include equivalent functionality.

The controller 402 receives input signals from various sources. These include the input signals mentioned above with reference to FIGS. 2 and 3. More specifically, the controller 402 receives signals from thermocouples 404. These provide temperature measurements for the input and output of the solar collectors, for the various stratification levels of the storage tank, for the input and output of the storage tank, for the input and output of the boiler, for the return of the absorption chiller, and for input and output of the cooling tower and chilled water loops.

Controller 402 also receives signals from the various flow meters 406. These include the flow meters that measure circulation through the solar collectors, through the heat loop, through the cooling tower and through the air handling unit.

Finally, controller 402 receives signals from potentiometers associated with proportional flow valves. These include the proportional flow valves that controls flow through the solar collectors and through the air handling unit.

The controller 402 also provides control signals to various components. These include the components mentioned above with reference to FIGS. 2 and 3. More specifically, the controller 402 provides signals to three-way actuator valves 410. These are used to select between various loop options for the solar collectors, the thermal storage tank and the heat loop.

The controller 402 provides signals to proportional valves 412. These include the valves that regulate flow through the air handling unit and through the solar collectors. The controller 402 provides signals to pumps 414. These are used to drive circulation through the solar collectors, the heater, the cooling tower and the air handling unit. The controller provides signals to the boiler 416 and to the fans 418. The fans 418 include the cooling tower fan and the air handling unit fan.

In operation, the controller 402 receives various input signals and automatically implements various control responses. In addition to the above signals, the controller may also receive a demand signal. This signal is based upon the actual temperature of the building or area and the desired temperature. When the actual temperature drops below the desired temperature, the demand operates to direct the controller to reduce the cooling effect. The controller will also receive a solar radiation signal from a pyrometer 409. Further aspects of the functionality of the controller will be better appreciated with reference to the FIGS. 5 through 10.

The controller is responsible for operating two proportional flow valves, one in the solar collector loop, and one in the cooling water loop. These actuators require the same basic control structure. In particular, the operation of these actuators should minimize steady state control error and have little or now overshoot when changing positions. Preferably, the control parameters are determined using a root-locus method.

Figure 5:
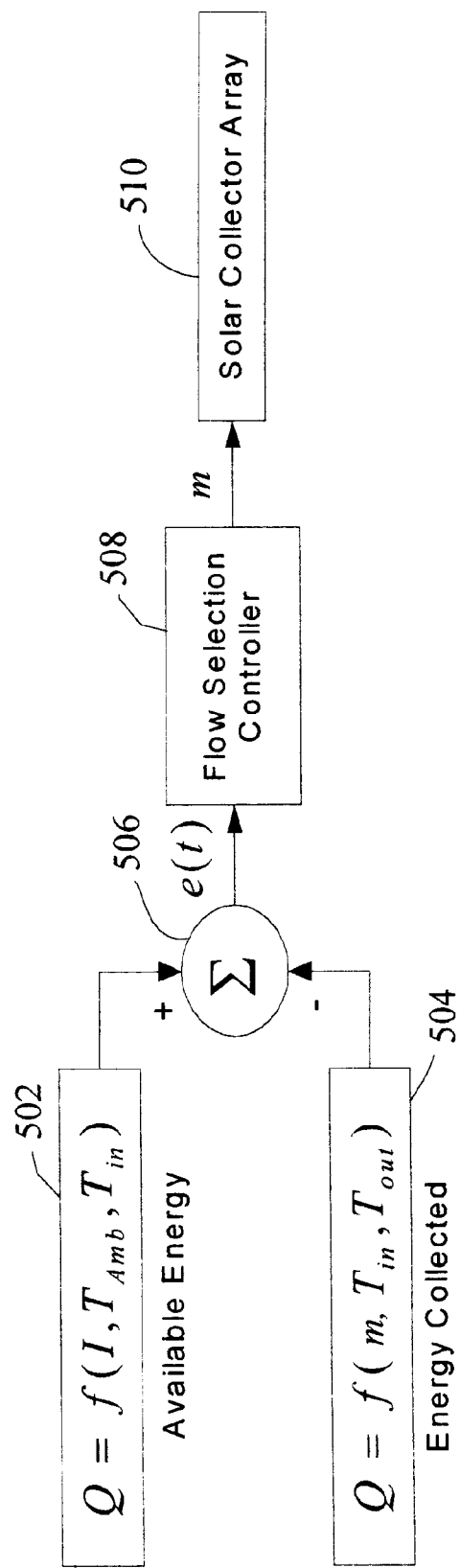
FIG. 5 is a block diagram of one preferred system used to control energy collection.

Turning to FIG. 5, one preferred control scheme for operating the solar collector loop is described. The purpose of the solar collector loop is to provide the energy necessary for operating the air conditioning system. Therefore, the main concern in developing a control unit for the collector array is to optimize the amount of energy collected.

One preferred model of solar collectors is described by Klein, S. A., Duffie, J. A., and Beckman, W. A., *Transient Considerations of Flat-Plate Solar Collectors,* Journal of engineering for Power, 1974, pp. 109–113, which is incorporated herein by reference. In accordance with that model, an array of solar collectors may be modeled using a one-node capacitance model. The following Equation 1, is derived from that model.

Equation 1:

$$C_C \frac{dT_m}{dt} = F'[(\tau\alpha)I - U_L(T_m - T_{amb})] - \frac{\dot{m}C_p}{A}(T_{out} - T_{in})$$

Where:

W=Collector array selective surface width
$C_c$=Collector lumped capacitance
F'=Collector efficiency factor
$(\tau\alpha)$=Transmittance absorption product
I=Solar radiation per Unit area on the collector plate
$U_L$=Collector Overallheat transfer coefficient
$T_{amb}$=Ambient temperature
$\dot{m}$=Mass flow rate
$C_p$=Specific heat of fluid
$T_f$=Fluid temperature at position x
$T_m$=Mean fluid tmperature across the collector
$T_{in}$=Inlet fluid temperature at the colletor
$T_{out}$=Outlet fluid temperature at the collector The first term on the right side of equation 1 gives the available energy that can be gathered by the collector while the second term gives the actual amount of energy collected. The available energy is thus a function of outdoor conditions, collector specifications, the incoming solar radiation and the fluid's incoming temperature. On the other hand, the collected energy is just a function of the fluid's mass flow rate and the difference of its input and output temperatures. Therefore, efficiency of the energy collection will depend on how much of the available energy is actually collected by the system. The control scheme attempts to minimize the difference between these two energy quantities. The controller will vary the mass flow rate of the incoming fluid so as to maximize the amount of energy gathered by the collector.

Previous efforts to maximize the amount of energy gathered by the collectors generally used a fixed flow rate in the collectors and sent flow into the storage tank when the temperature in the collector inlet was higher than the tank temperature. This fixed mass flow rate was calculated using experimental tests to determine the optimal flow rate for the mean solar radiation in the region where the collectors were being installed. However, using a fixed flow rate slows the heat up process of the collectors during startup since they are required to provide more power than they can deliver. Using variable flow rates allows the solar collectors to preheat at a faster rate than with a fixed flow rate since the flow can be regulated to a value where the collectors can provide positive energy under low radiation conditions.

Therefore, the most efficient form of a variable flow collector configuration will be that in which that optimal flow rate is attained for every radiation value. However, some constraints must be set on this controller. The mass flow rate should not go below a specified flow rate amount since the strain that will be induced in the pump by reducing the flow too much can damage it. The proposed strategy for the solar collectors takes into account these factors as saturation constraints for the flow controller. The optimal solution to this problem involves the solution of a bilinear optimal control for which a sub-optimal solution must be developed in order to implement such a controller. The performance index desired from an optimal solution in the collection of energy is the integral over time of the collected energy, as expressed in Equation 2.

Equation 2:

$$J = \int \dot{m} C_p (T_f - T_i) dt$$

This optimization resides in attaining the maximum product of two variables, the flow rate and the difference of inlet and outlet collector temperatures. Using the one-node capacitance model under steady-state operation, a near-optimal solution can be attained. Under steady-state operation, the one-node capacitance model is expressed in Equation 3.

Equation 3:

$$\dot{m} C_p (T_f - T_{in}) = A * F' [(\tau \alpha) I - U_L (T_f - T_{amb})]$$

Substituting the difference in inlet and outlet temperatures, $\Delta T$, to eliminate the outlet temperature $T_f$ from the above equation yields equation 4.

Equation 4:

$$\dot{m} C_p \Delta T = A * F' [(\tau \alpha) I - U_L (T_i + \Delta T - T_{amb})]$$

Solving the resulting equation for the mass flow rate, $\dot{m}$, gives the necessary flow rate to provide a desired temperature increase $\Delta T$ across the solar collectors.

$$\dot{m} = \frac{A * F' [(\tau \alpha) I - U_L (T_i + \Delta T - T_{amb})]}{C_p \Delta T} \tag{35}$$

That is, given the maximum amount of energy that can be achieved from the collector in terms of the incoming radiation and ambient temperature, and a desired temperature gain across the collectors, select the flow rate accordingly. The reason for eliminating $T_f$ from the equation is because a fixed outlet temperature across the collector is not the desired solution to the problem. The inlet temperature would increase according to the collected energy during the day, so it is desired to increase the outlet temperature as the inlet temperature increases, thus the use of the change across the collector $\Delta T$, instead of the outlet temperature. This solution can be seen as a tracking solution in which the algorithm keeps track of the desired $\Delta T$ despite of changes in the system variables. Although, this algorithm ensures that the desired $\Delta T$ will be met, it still leaves the problem of determining an optimal $\Delta T$ for the given system. Although the optimal solution of the variable $\Delta T$ can be calculated over the length of the day operation, a fixed $\Delta T$ can be found experimentally that will maximize the energy collection. This becomes a near-optimal operation for the solar collector array, and reduces processing requirements to determine a variable $\Delta T$.

FIG. 5 shows a block diagram of one preferred decision strategy used to control flow through the solar collectors. The flow selection controller must determine the mass flow rate needed by the solar collector array to make the difference between the available energy and the collected energy a minimum. This decision is made by comparing the available energy 502 with the energy collected 504 through a summer 506. The resulting error signal, e(t), provides the correction factor used to adjust the flow at block 508. This correction, in turn, determines the actual flow through the solar collectors at block 510.

It should be noted that previous research efforts typically showed fixed flow rates as the optimal solution to the energy collection problem. Those applications, however, differed in that they considered the cost of pumping for optimization. That is, the pumping cost was considered since the purpose of those applications was solar heating rather than solar cooling. The result was to use on-off flow when the energy gathered by the collector overcame the pumping cost.

In the case of applications for solar cooling, the analysis must change since considering pumping costs reduces the amount of time in which the air conditioning system would be operational or increases the amount of time that an auxiliary heat source is needed. For solar powered air conditioning, where the amount of electricity for cooling is preferably less than 30% of the amount of energy used by the system, an increase in energy collected overcomes the pumping costs. Therefore, by continuously varying the flow rate, the collectors are allowed to work for longer periods of time in the day, so that the system can extend the time it uses solar power for cooling.

In one preferred embodiment of the invention, the control system is operated to maximize energy collection by varying the flow rate to achieve a fixed temperature difference from the input of the solar collectors to their output. The preferred temperature difference is determined experimentally for the particular location and solar collectors. While the temperature collection may be increased marginally by varying the desired temperature difference across the solar collectors based upon ambient conditions, this fixed term provides a near optimal solution that is substantially easier to implement on a practical system.

Although the flow selection controller process is attempting to gather the maximum amount of energy from the collectors, the storage tank must allow heated water into the tank only if it increases the total amount of energy stored. This decision is implemented via the recirculating three-way valve. In one state it allows will allow flow into the storage tank. This occurs only if the conditions for increasing the stored energy are met. Otherwise, the three-way valve will recirculate the flow through the solar collectors until the necessary temperature in the collector's output is reached.

Although the solar collector array is the main energy source for the absorption chiller, it provides this energy indirectly via the storage tank. However, it is possible to use the solar collector array to directly power the absorption chiller. For this mode of operation the diverting three-way valve is used.

Also, the on-off three-way valve used to recirculate the collector flow is disabled since the controller for this configuration overrides the control for the recirculation valve mentioned previously. Thus, the water flows from the storage tank to the collectors, from the collectors directly to the absorption chiller and back to the storage tank. The diverting three-way valve will regulate the flow to allow the heat input stage of the absorption chiller to receive its needed flow rate and to divert any remaining flow from the solar collectors into the storage tank. It should also be noted that the pump delivering flow from the storage tank to the absorption chiller is also disabled, so that the solar collector's pump runs the entire loop.

There are two conditions that enable the operation of this control scheme. The first condition is when there is not enough energy available in the storage to run the absorption chiller, and the second condition is when the storage has a median temperature that is above the nominal operational temperature of the chiller. The first condition allows the system to start cooling even if the tank conditions are not suitable for operation. The second condition allows the system to run at a temperature higher than its nominal state. This strategy improves performance while minimizing the heat removal from the storage tank and increasing the operating hours. When either of these conditions is met, the diverting valve begins to regulate the flow rate until the flow in the chiller loop reaches the necessary value for proper operation. From this point on, the controller monitors whether the conditions for this control scheme still hold, to either stop the chiller operation or return its power source to the storage tank. This control strategy combines both linear and nonlinear control actions. The linear control system is the flow rate control of the fluid going into the absorption chiller. The flow control of the collector loop can also be considered linear. However, during this configuration the controller must guarantee the collector flow to be greater than or equal to the flow in the heat input loop. This constitutes a nonlinear restraint in the controller, thus making the flow control of the collector loop to exhibit nonlinear behavior.

Figure 6:
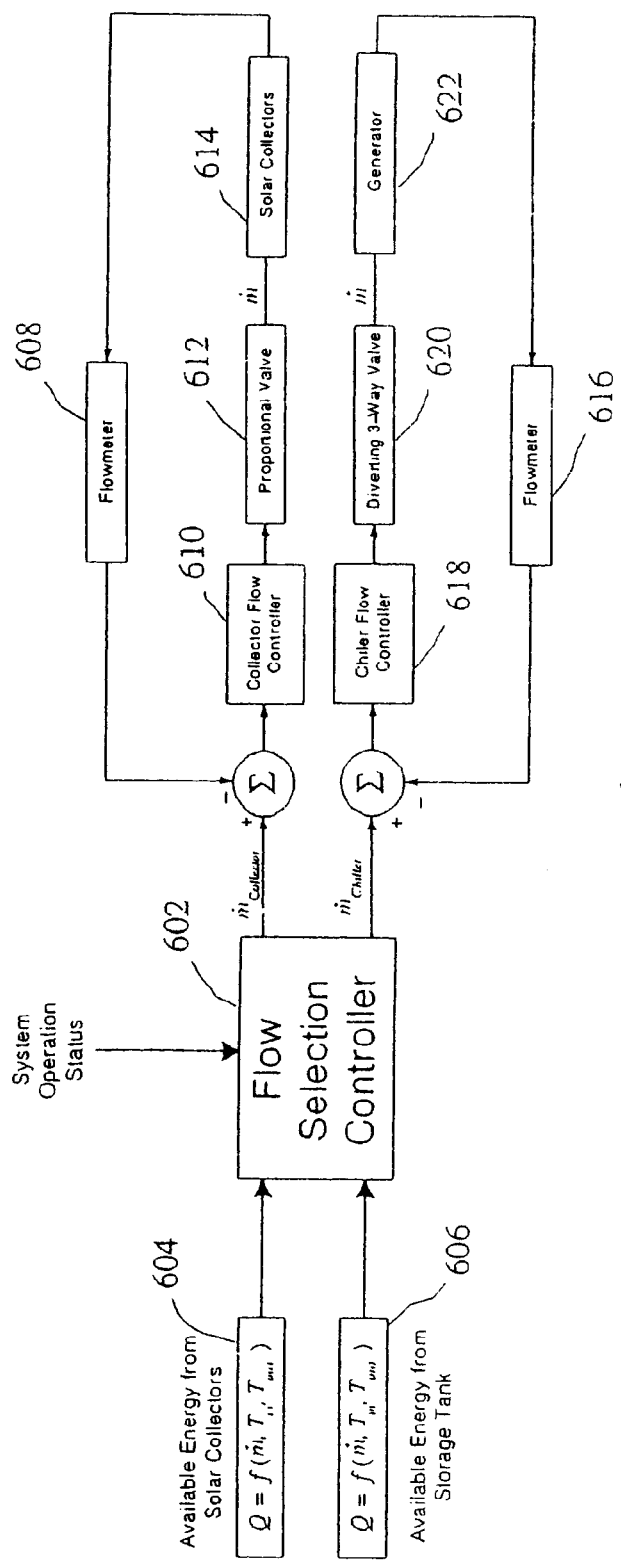
FIG. 6 is a block diagram of another preferred system used to control energy collection.

One preferred block diagram of the decision process for this configuration is shown in FIG. 6. It includes a controller 602 that determines the flow selections. This determination is made based upon a calculation of the available energy from the solar collectors at block 604, and a calculation of the available energy from the storage tank at block 606.

When circulating directly from the solar collectors to the absorption chiller, the desired flow through the solar collectors is determined by the controller 602 and compared to the actual flow from block 608. The resulting signal is used to generate a control signal for the proportional valve in the solar collector loop at block 610. This signal is provided to the proportional valve at block 612, which in turn determines the actual flow through the solar collectors at block 614. Likewise, the desired flow to the absorption cooler is determined by controller 602 and compared to the actual flow from block 616. The resulting signal is used to generate a control signal to the diverting three-way valve at block 618. This signal is provided to the diverting three way valve at block 620, which in turn determines the actual flow to the absorption chiller at block 622.

In this mode of operation, the flow selection controller 602 monitors the conditions of the absorption chiller and the available energy from both the solar collectors and the storage tank. If the decision to power the chiller from the solar collectors is enabled, the controller 602 will control all operation for the solar collector flow control valve, recirculating three-way valve, and the heat medium pump. It will disable both the recirculating three-way valve and the heat pump, and set the flow controllers' inputs of the heat loop and solar collector loop to their corresponding values.

Turning to the lithium-bromide absorption chiller used in the air conditioning system, it requires three basic components in order to perform as designed. These components are the heat source, the cooling tower, and the chilled water loop. The first requirement with this system is to assure proper operation of the absorption chiller.

The main task of the control scheme is to protect the absorption chiller and to ensure its proper operation. Each of the three loops, the heat loop, the cooling tower loop and the chilled water loop, require monitoring and control. In the heat loop, the temperature of the input fluid must be kept above 75° C. Also, the incoming flow rate should be kept within a specified boundary according to the absorption chiller specifications. If either of these two criteria are not met, crystallization of the lithium bromide solution may occur and may render the absorption chiller temporarily inoperable. While the absorption chiller is operating, the cooling tower must be removing heat from it in order for the absorption cycle to take place. Again, failure to remove the necessary heat can result in crystallization of the lithium bromide solution. Finally, in the chilled water loop, the output chilled water temperature should not go below 8° C. or the line could begin to freeze. If the line freezes, damage to both the line and to the chilled water heat exchanger may occur. In order to monitor these conditions the following control scheme is used.

Figure 7:
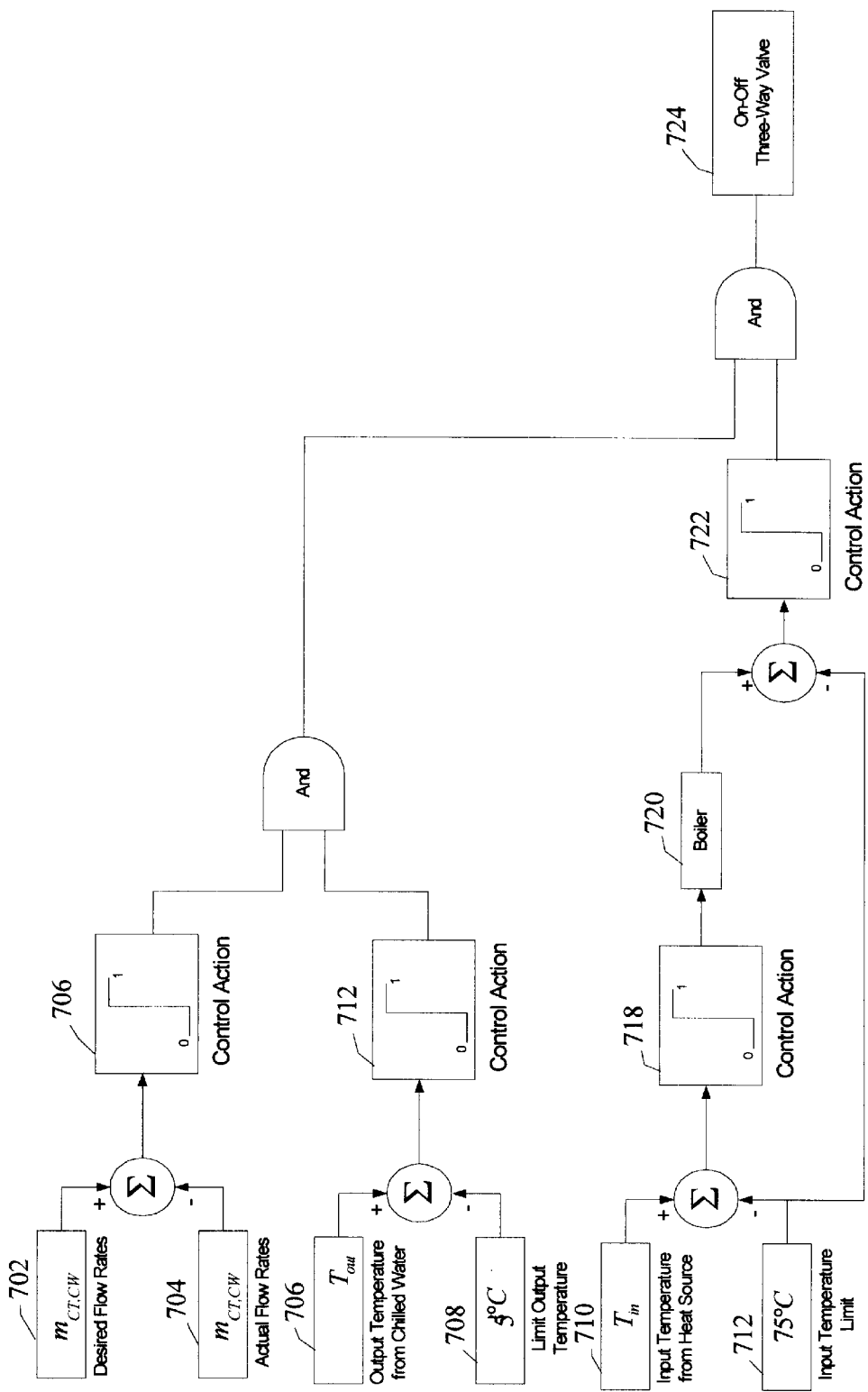
FIG. 7 is a block diagram of one preferred system used to control the flow and operation through the auxiliary boiler 308 (FIG. 3) and the heat inlet to the absorption chiller 302 via a three way valve.

If any of the loops has a flow rate outside its predetermined boundaries, the On-Off three-way valve closes the hot water flow path to the absorption chiller. Other variables to monitor are the heat loop inlet temperature at the absorption chiller and the chilled water outlet temperature. If any of these signals is outside of its safety parameters the controller will close the hot water flow path to the chiller. If the only parameter outside the required operating values is the incoming heat temperature, then the controller automatically starts up the gas-fired boiler in order to provide the needed heat. If the boiler cannot provide enough energy to reach the required temperature, the hot water supply is shut off. A block diagram of the control scheme is shown in FIG. 7.

From the block diagram, the controller will check if the mass flow rates are in their ranges. Specifically, the desired mass flow rates specified at block 702 and the actual mass flow rates are determined at block 704. These desired and actual mass flow rates are compared to determine a control variable. At block 706, if the actual mass flow rates are greater than the desired mass flow rates, then the control variable is set, otherwise it is cleared.

The controller also checks the freezing condition in the chilled water loop. Specifically, the actual output temperature is determined at block 708, and the desired output temperature is set at block 710. The actual and desired output temperatures are compared to determine a control variable. At block 712, if the actual temperature is greater than the desired temperature, then the control variable is set, otherwise it is cleared.

As for the heat water input, the system monitors whether the temperature from the heat loop is adequate. If the criterion is not met, the controller will start up the gas-fired boiler. If the temperature out of the boiler still does not meet the temperature criterion, then the three-way valve is turned off.

With reference to FIG. 7, the actual input temperature from the heat loop is determined at block 710, and the desired input temperature from the heat loop is set at block 712. These temperatures are compared to determine a control variable. At block 718, if the actual input temperature is less than the desired input temperature then the control variable is set, otherwise it is cleared. If the control variable is set then at block 720, the boiler is activated. The actual input temperature is again compared with the desired input temperature. At block 722, the comparison between actual and desired input temperature determines a control variable. If the actual is greater than the desired input temperature, then the control variable is set, otherwise it is cleared.

Finally, the final value of the control variables are from blocks 706, 712 and 722 are combined through a logical "AND" function. If all three are set, the on-off three-way valve 724 routes flow through the absorption chiller, else through a sub-loop.

To optimize performance, the flow through the chilled water loop is also controlled. The objective of this control loop is to reduce the transient response of the chilled water line to enable faster operation of the absorption chiller in producing effective cooling. The control variable is the flow rate in the chilled water line. For this control loop it is assumed that the operating conditions for the cooling tower and the generator heat input are met.

Figure 8:
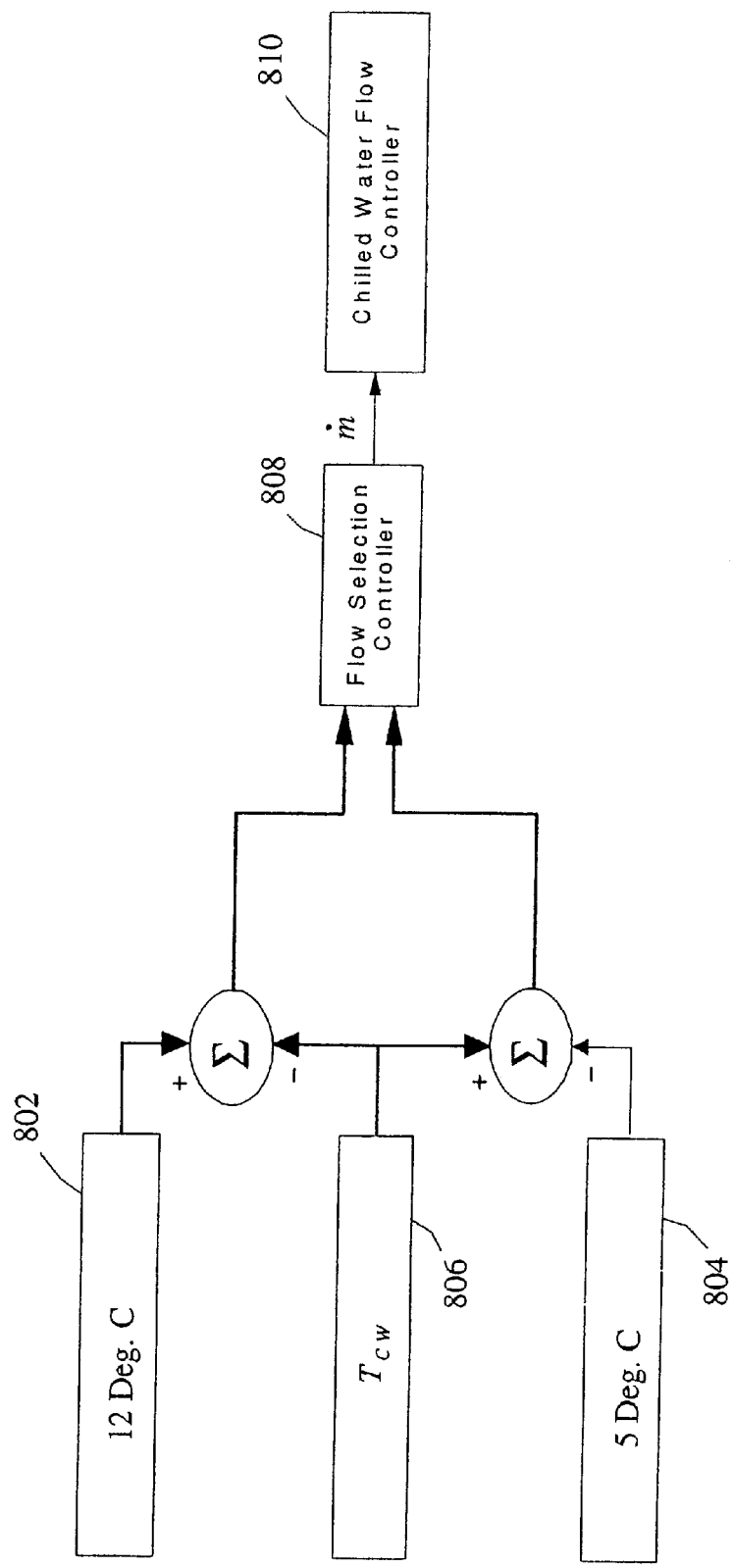
FIG. 8 is a a block diagram of one preferred system used to control the flow through a chilled water loop.

A flow sub-controller is used to regulate the flow rate in the chilled water line to meet the operating point of the absorption chiller, which is around 8 to 10° C. This allows the air-handling unit to begin operation faster than under nominal operation flow. The air-handling unit must wait for the chilled water line to reach its operating point before starting since the load that it produces will not allow the chiller to reach this operating point otherwise. Once the chilled water outlet temperature has reached its operating point, the controller must compensate for load changes in the cooled space. FIG. 8 shows the block diagram for the decision controller.

The absorption chiller acts as a constant cooling supply, therefore any changes in the chilled water outlet temperature must come from changes in the thermal load. The chilled water outlet temperature is thus used to signal the controller of any changes in the thermal load. When the controller determines an increase in the thermal load, it will regulate the chilled water flow to remove this extra load.

As shown, the desired upper temperature limit is set at block 802 and the desired lower temperature limit is set at block 804. The actual temperature of the chilled water loop is determined at block 806. The actual temperature is compared to both the upper and the lower limit. At block 808, these comparisons are used to generate a control signal. This is provided to the flow valve at block 810.

In one mode of operation, the absorption chiller is powered directly by the solar collectors. To initiate this control scheme the output conditions of the solar collector array are monitored to determine which of the heat sources, the thermal storage or the solar collectors directly, will power the absorption chiller. If the energy being provided by the collector is greater than the energy that could be provided by the storage tank, then the solar collectors should supply power to the absorption chiller provided they have enough energy available to do so. Otherwise, the thermal storage tank will supply power to the absorption chiller. However, the system actuators need to perform a set of tasks before this scheme is finally implemented.

The startup of this scheme depends on whether the absorption chiller is operating at that instant. If the chiller is not operating, then the following startup sequence is performed:

1. Start Boiler Operation: this will ensure that heat power is not lost during the period in which the flow in the heat medium has not reached its steady-state.
2. Enable Diverting three-way valve: by enabling this valve, it will regulate the flow to the heat loop to its nominal value while the rest of the flow will go into the storage tank.
3. Allow Absorption chiller operation: At this point, all the necessary conditions for the opening of the absorption chiller three-way valve are met, so the three-way valve is opened and the boiler is thus shut off.

When the conditions for operating the absorption chiller through the solar collectors are no longer met, the system must disable the operation of the diverting three-way valve and enable the heat medium pump. This will create a sudden boost in the flow rate through the heat medium during the time it takes the diverting valve to shut down. During that sudden boost, the heat medium's three-way valve will tend to close, reducing the amount of flow going into the heat medium.

If the system is already started, the set of tasks needed to ensure proper operation of the system during the power supply switch from the storage tank to the solar collector are similar to the shutdown sequence from the previous scenario. The sequence enables the operation of the diverting three-way valve to its halfway position. At this point, it disables the heat medium pump. This will create a gradual increase followed by a sudden decrease in the flow rate through the heat medium during the time it takes the diverting valve to regulate the flow. During that time, the heat medium's three-way valve will tend to close, resulting in a shutdown and restart of the absorption chiller.

When the conditions for operating the absorption chiller from the solar collectors are no longer met, the controller will switch back the power supply to the heat medium pump as it did in the previous scenario.

Figure 9:
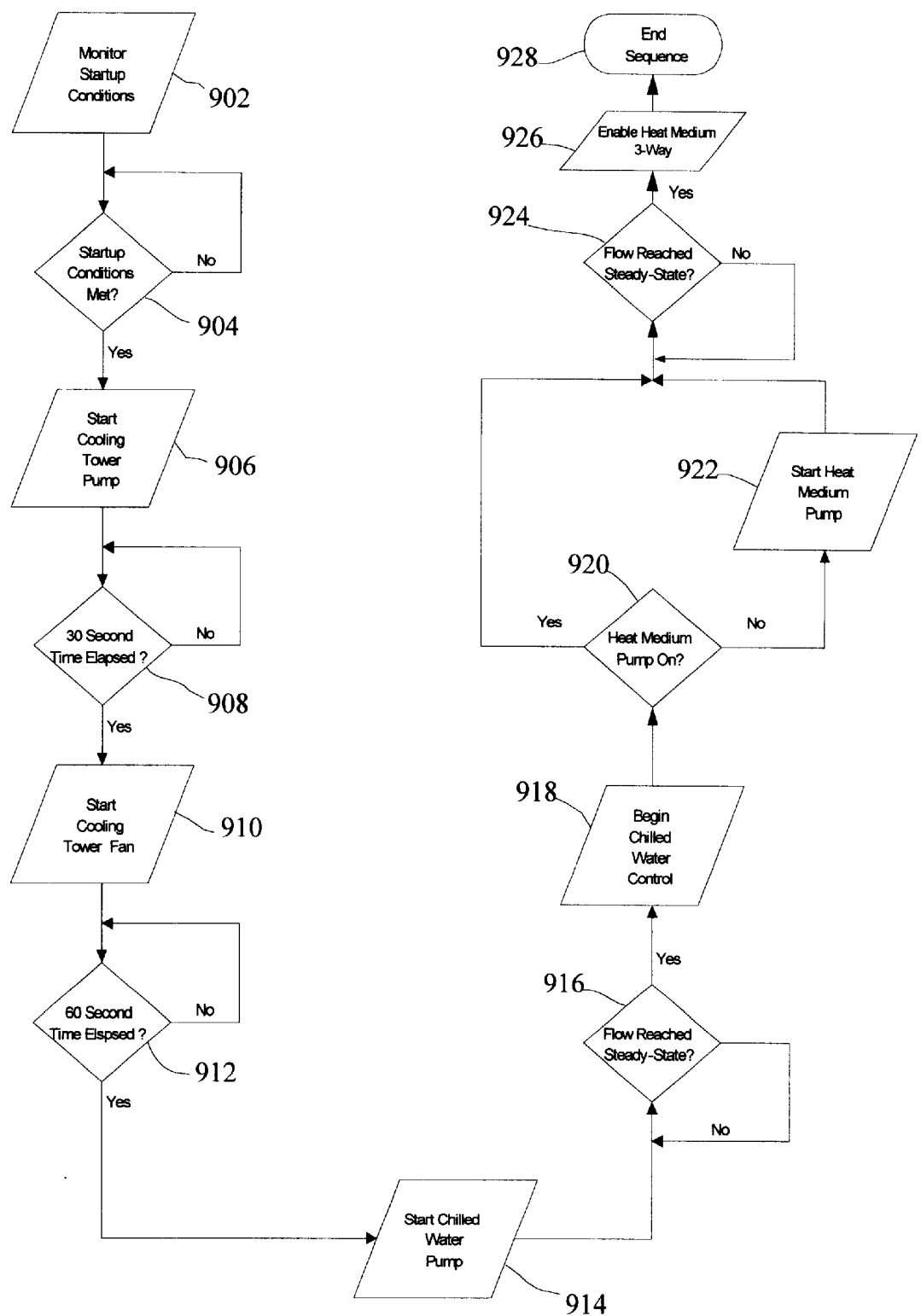
FIG. 9 is a flow chart showing one preferred method of starting operation of an absorption chiller.

The control scheme for the heat input of the absorption chiller is a decisional control strategy. Besides enabling the three-way valve that allows flow from the heat loop into the absorption chiller, it controls the operation of the loops for the cooling tower and chilled water. When the absorption chiller is disabled, the controller monitors whether the time of day is within the time frame set to allow its operation. Once this condition is met, the controller looks for operating conditions in the thermal storage tank. If conditions in the tank are not met, the controller will enable a preheat process for the tank using the boiler to deliver energy to the tank. As the tank heats up to operating conditions, the controller will commence the startup sequence for the system. The startup sequence consists of starting all loops needed for the operation of the absorption chiller and ensuring that they are operating within their specified parameters. FIG. 9 is a flow chart showing one preferred start up sequence of the air conditioning system.

At block 902 the start-up conditions are monitored. Then, at decision 904, these are checked to determine whether they fall within acceptable ranges of operations. If not, the controller continues monitoring the conditions, otherwise, the cooling tower pump is started at block 906. Then, at decision 908, the controller determines whether thirty seconds have elapsed since starting the cooling tower fan. If not, the controller waits for that time to pass. Then at block 910, the controller starts the cooling tower fan. Then, at decision 912, the controller determines whether the cooling tower fan has ran for sixty seconds. If not, the controller waits for that time to pass. Then, at block 914, the controller starts the chilled water pump 914. Then, at decision 916, the controller waits for the flow to reach steady state maximum. When this occurs, it proceeds to step 918 and begins the chilled water control operations. The controller will regulate the flow in the chilled water loop to its nominal value using the proportional flow actuator. Then, at decision 920, the controller determines whether a preheat process was used. If not, it starts the heat pump at 922. The controller will enable flow in the heat loop, either from the solar collectors or through the storage tank by enabling the heat pump. If the preheat process was enabled, the sequence ends since the heat pump was started already in the preheat process.

Next, at decision 924, the controller waits to detect a steady state flow through the loops. This permits the controller to enable the heat three-way valve. The conditions of the valve involve monitoring that the flow rates in the loops are approximately at their nominal values, as recommended b the absorption chiller manufacturer. Also, the controller monitors that the incoming temperature in the heat medium and the outgoing temperature in the chilled water loop lie between their operational parameters. For the heat medium, the three-way valve will open when the incoming temperature is higher than 85° C. and it will shut down once the temperature goes below 77° C. In the chilled water loop, the three-way valves closes when the temperature goes below 5° C. and reopens at 12° C.

The starting of the air handling unit should also be mentioned. When the chiller is started, the temperature in the chilled water loop begins to decrease. The air handling unit is started only after the chilled water temperature reaches 8° C. Experimental tests show that starting the air handling unit in this way allows the chiller to reach its operating conditions faster and allows it to self-regulate its output once the air handling unit is started.

When air conditioning system is cooling, the boiler is disabled until the temperature of the hot water being fed to the chiller reaches a value lower than 78° C. When this temperature boundary is reached, the controller starts the boiler to make up for the heat deficiency. The boiler is disabled again when the incoming fluid reaches 80° C. This condition is allowed only if the system is operating and its timer value is within the operating hours.

Figure 10:
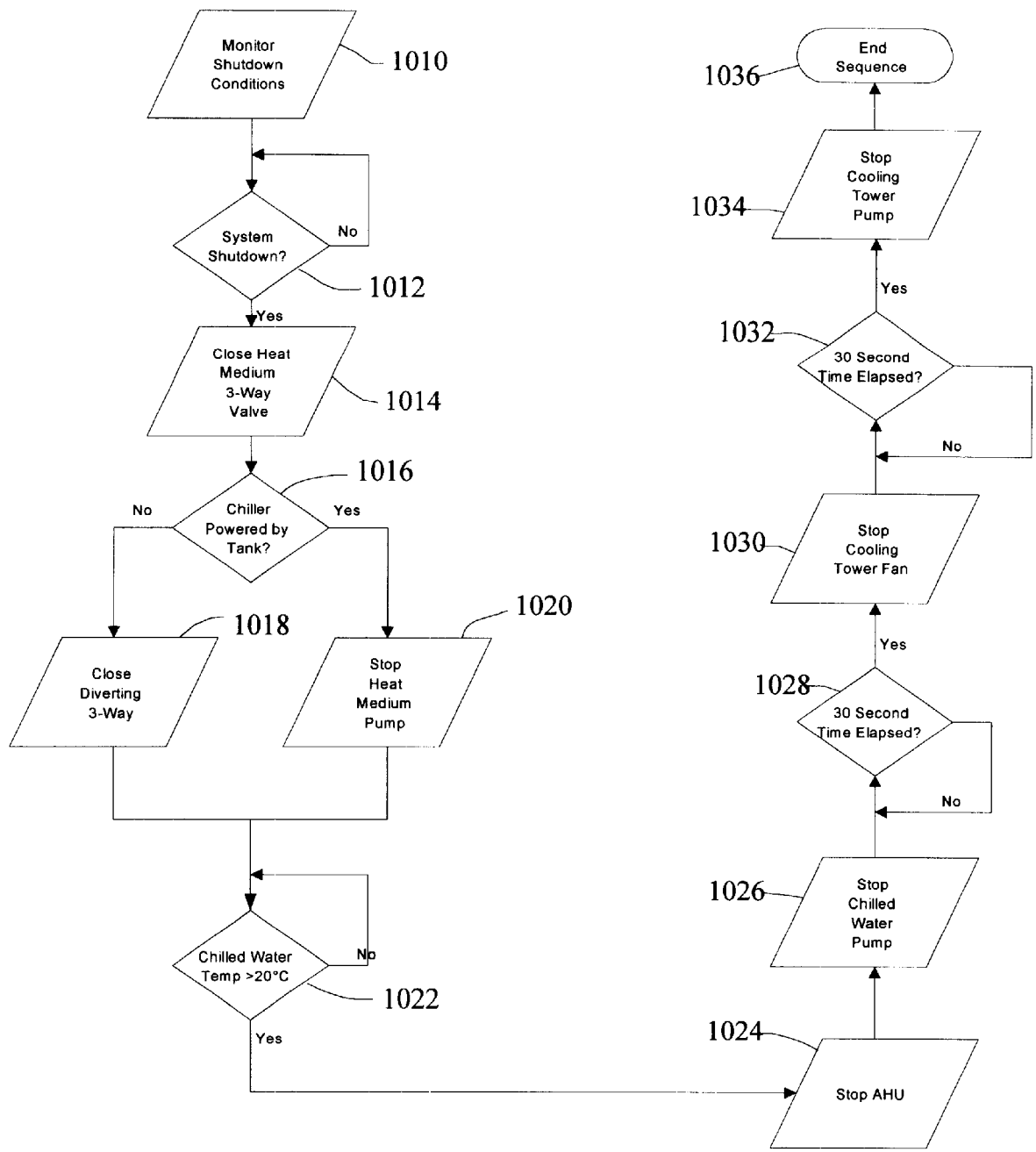
FIG. 10 is a flow chart showing one preferred method of shutting down operation of an absorption chiller.

Once the conditions for operation in the absorption chiller are no longer met, a shutdown sequence is used to disable its actuators. FIG. 10 shows a flowchart of one preferred shutdown decision process. Beginning at step 1010, the controller monitors system conditions. At decision 1012, the controller determines whether these require system shutdown. If so, at step 1014, the controller closes the three-way valve from the heat loop. This stops flow through the absorption chiller. Then at decision 1016, the controller determines whether the absorption chiller was powered by the storage tank or by the heater. If it was powered by the storage tank, then at step 1018, the diverting three-way valve is closed. This stops flow into the heat loop. If it was powered by the boiler, then at step 1020, the heat pump is stopped. This also stops flow into the heat loop. Next, at step 1022, the controller waits for the temperature of the chilled water loop to be discharged into the cooled space. This is achieved by leaving the air handling unit as well as the chilled water pump running until the temperature of the chilled water reaches 20° C. When this happens, the air handling unit is shut down at step 1024 and the chilled water pump is shut down at step 1026. Then, at decision 1028, the controller waits for thirty seconds to elapse. When this occurs, the cooling tower fan is stopped at step 1030. Again, at decision 1032, the controller waits for thirty seconds to elapse. When this occurs, the controller stops the cooling tower pump, and completes the shut-down sequence.

Although the invention has been described with reference to preferred embodiments, those skilled in the art will appreciate that many variations and modifications are possible without departing from the scope of the invention. For one example, the air conditioning and control system has been described with reference to systems that include a cooling tower. In a preferred embodiment especially suitable for small cooling loads, the absorption chiller is an air cooled absorption machine. Accordingly, the cooling tower and related control systems are omitted. For another example, the system has been described with a control system that maintains a fixed temperature change across the solar collectors in order to reduce processing requirements by the controller. In other preferred embodiments where additional processing power is available, the optimal temperature change across the solar collectors is determined based upon a signal from a pyromenter. This is, in turn, used to control the flow rate through the solar collectors. All such variations and modifications are intended to be encompassed within the scope of the following claims.

We claim:

1. A method of operating a solar powered air conditioning system comprising the steps of:

circulating a fluid through at least one solar collector;

regulating a rate at which the fluid circulates through the at least one solar collector, wherein the rate is increased when the at least one collector produces a greater increase in temperature of the fluid, and wherein the rate is decreased when the at least one collector produces a lesser increase in temperature of the fluid;

pumping the fluid through an absorption chiller after circulating the fluid through the at least one solar collector;

pumping a refrigerant through the absorption chiller and through a heat exchanger positioned within a building, wherein the heat exchanger cools the ambient temperature of the building, circulating the fluid through a storage tank after circulating the fluid through the at least one solar collector, determining a temperature of the storage tank at a plurality of positions; and drawing the fluid from the storage tank proximate the position having a lower temperature than the other positions.

2. The method of claim 1, wherein in the step of pumping the fluid through the absorption chiller, the fluid is drawn from the storage tank.

3. The method of claim 1, wherein the step of circulating the fluid through the storage tank further comprises:

circulating the fluid through a closed loop that excludes the storage tank when the at least one solar collector draws insufficient energy to increase the temperature of the fluid in the storage tank; and circulating the fluid through the storage tank when the at least one solar collector draws sufficient energy to increase the temperature of the fluid in the storage tank.

4. A method of operating a solar powered air conditioning system comprising the steps of:

circulating a fluid through at least one solar collector;

regulating a rate at which the fluid circulates through the at least one solar collector, wherein the rate is increased when the at least one collector produces a greater increase in temperature of the fluid, and wherein the rate is decreased when the at least one collector produces a lesser increase in temperature of the fluid;

pumping the fluid through an absorption chiller after circulating the fluid through the at least one solar collector;

pumping a refrigerant through the absorption chiller and through a heat exchanger positioned within a building, wherein the heat exchanger cools the ambient temperature of the building;

circulating the fluid through a storage tank after circulating the fluid through the at least one solar collector;

determining a temperature of the fluid in the storage tank in at least one position;

determining a temperature of the fluid after passing through the at least one solar collector; and opening a valve that permits flow of the fluid from the at least one solar collector when the temperature of the fluid after passing through the at least one solar collector is greater than the temperature of the fluid in the storage tank in at least one position.

5. The method of claim 1, further comprising the step of circulating a coolant between the absorption chiller and a cooling tower by operation of a pump.

6. A method of operating a solar powered air conditioning system comprising the steps of:

circulating a fluid through at least one solar collector;

regulating a rate at which the fluid circulates through the at least one solar collector, wherein the rate is increased when the at least one collector produces a greater increase in temperature of the fluid, and wherein the rate is decreased when the at least one collector produces a lesser increase in temperature of the fluid;

pumping the fluid through an absorption chiller after circulating the fluid through the at least one solar collector;

pumping a refrigerant through the absorption chiller and through a heat exchanger positioned within a building, wherein the heat exchanger cools the ambient temperature of the building; and pumping a refrigerant through the absorption chiller and through the heat exchanger without applying a load at the heat exchanger, wherein the heat exchanger has negligible effect upon the ambient temperature of the building.

7. A method of operating a solar powered air conditioning system comprising the steps of:

circulating a fluid through at least one solar collector;

regulating a rate at which the fluid circulates through the at least one solar collector, wherein the rate is increased when the at least one collector produces a greater increase in temperature of the fluid, and wherein the rate is decreased when the at least one collector produces a lesser increase in temperature of the fluid;

pumping the fluid through an absorption chiller after circulating the fluid through the at least one solar collector;

pumping a refrigerant through the absorption chiller and through a heat exchanger positioned within a building, wherein the heat exchanger cools the ambient temperature of the building, wherein the step of pumping the refrigerant through the heat exchanger continues for an extended period of time after the step of circulating fluid through the at least one solar collector terminates.

8. A method of operating a solar powered air conditioner comprising the steps of:

pumping a first fluid through a plurality of solar collectors, wherein the flow rate is directly related to the amount of energy absorbed by the solar collectors, and wherein the flow rate is adjusted to effect a fixed temperature difference between an input to and an output from the plurality of solar collectors, and wherein the fixed temperature difference is set independent of a temperature of the first fluid in a stratified storage tank;

determining a temperature of the first fluid after passing through the solar collectors;

determining a temperature of the first fluid in the stratified storage tank;

pumping the first fluid from the plurality of solar collectors to the stratified storage tank when the temperature of the first fluid after passing through the solar collectors is greater than the temperature of the first fluid in the stratified storage tank;

pumping the first fluid from the plurality of solar collectors to an absorption machine while the plurality of solar collectors absorb energy;

pumping the first fluid from the stratified storage tank to the absorption machine when the plurality of solar collectors absorb an decreased amount of energy; and pumping a second fluid through the absorption chiller and to a heat exchanger configured to reduce an internal temperature of a building.

9. A solar powered air conditioning system comprising:

a plurality of solar collectors positioned to absorb energy;

a pump operationally coupled with the solar collectors and configured to circulate a fluid through the solar collectors;

a first thermocouple positioned at the plurality of solar collectors to determine a temperature of the fluid after passing through the plurality of solar collectors;

a proportional flow valve operationally coupled with the plurality of solar collectors and configured to control a rate of flow of the fluid through the plurality of solar collectors;

a closed loop operationally coupled with the plurality of solar collectors;

a storage tank loop operationally coupled with the plurality of solar collectors and a storage tank;

a second thermocouple positioned at the storage tank and configured to determine a temperature of the fluid within the storage tank;

an absorption machine loop operationally coupled with the plurality of solar collectors and an absorption machine;

at least one shut-off valve operationally coupled with the closed loop, the storage tank loop and the absorption machine loop and configured to direct the flow of the fluid from the plurality of solar collectors;

a controller operationally coupled with the first thermocouple, the second thermocouple, and the at least one shut-off valve and configured to stop circulation of the fluid from the solar collectors to the storage tank when the temperature of the fluid within the storage tank; and a cooling circuit operationally coupled with the absorption machine and configured to effect a decrease in temperature to the interior of a building.

10. The solar powered air conditioning system of claim 9, wherein the at least one shut-off valve comprises a three-way valve.

11. The solar powered air conditioning system of claim 9, further comprising a cooling tower operationally coupled with the absorption machine.

12. The solar powered air conditioning system of claim 9, wherein the controller is further configured to direct the proportional flow valve to effect a fixed temperature difference across the plurality of solar collectors.

13. A solar powered air conditioning system comprising:

a plurality of solar collectors positioned to absorb energy;

a pump operationally coupled with the solar collectors and configured to circulate a fluid through the solar collectors;

a first thermocouple positioned at the plurality of solar collectors to determine a temperature of the fluid after passing through the plurality of solar collectors;

a closed loop operationally coupled with the plurality of solar collectors;

a storage tank loop operationally coupled with the plurality of solar collectors and a storage tank;

a second thermocouple positioned at the storage tank and configured to determine a temperature of the fluid within the storage tank;

an absorption machine loop operationally coupled with the plurality of solar collectors and an absorption machine;

at least one shut-off valve operationally coupled with the closed loop, the storage tank loop and the absorption machine loop and configured to direct the flow of the fluid from the plurality of solar collectors;

a controller operationally coupled with the first thermocouple, the second thermocouple, and the at least one shut-off valve and configured to stop circulation of the fluid from the solar collectors to the storage tank when the temperature of the fluid after passing through the solar collectors is less than the temperature of the fluid within the storage tank; and
a cooling circuit operationally coupled with the absorption machine and configured to effect a decrease in temperature to the interior of a building.

14. The solar powered air conditioning system of claim 13, wherein the at least one shut-off valve comprises a three-way valve.

15. The solar powered air conditioning system of claim 13, further comprising a cooling tower operationally coupled with the absorption machine.

* * * * *